Oct. 21, 1958     C. R. MORGAN ET AL     2,856,776
FLOATED GYROSCOPES
Filed Sept. 30, 1955
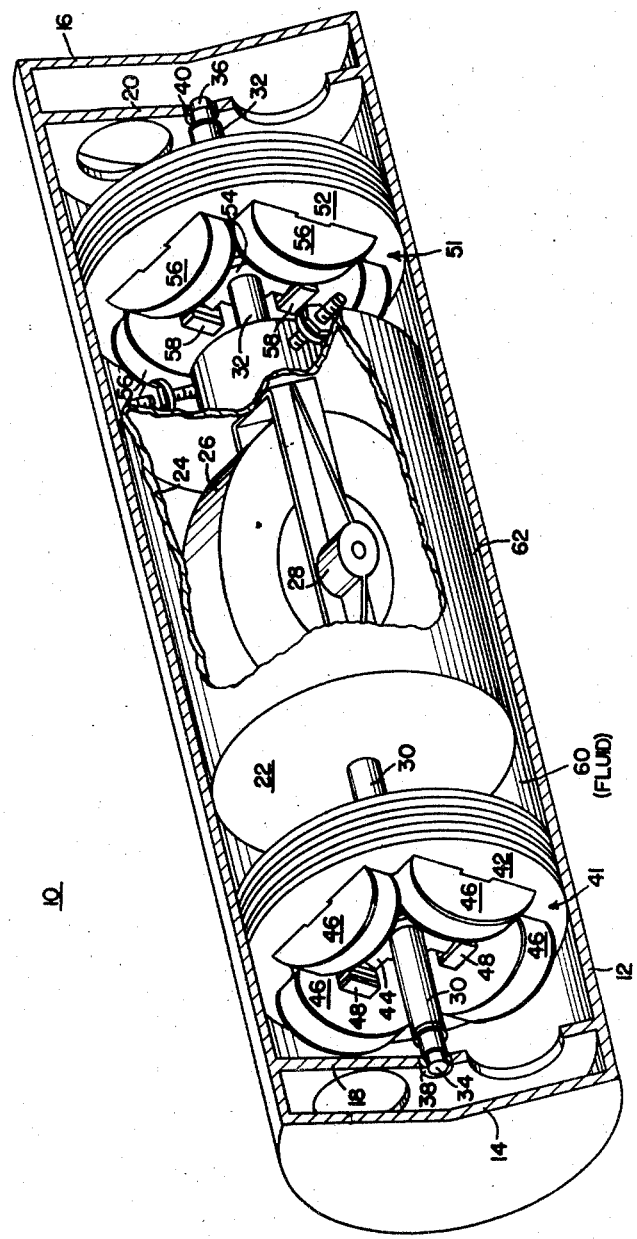
INVENTORS
CLARENCE R. MORGAN
WALTER F. OLDS
BY
*Orvin M. Haugen*
ATTORNEY 2,856,776

FLOATED GYROSCOPES

Clarence R. Morgan, Marblehead, and Walter F. Olds, Arlington, Mass., assignors, by mesne assignments, to Minneapolis-Honeywell Regulator Company, a corporation of Delaware Application September 30, 1955, Serial No. 537,664

7 Claims. (Cl. 74—5)

This invention pertains to gyroscopes and more particularly to gyroscopes of the floated type.

A floated gyroscope is a gyroscope having a gimbal assembly including a spin motor disposed in or surrounded by a fluid, the densities of the fluid and the gimbal assembly being selected so that the gimbal assembly floats in the fluid. The gimbal assembly may then be supported for rotation about its output axis on delicate practically frictionless bearings since the bearings support virtually no load. The fluid, in addition to buoying up the gimbal structure, also protects the device from impact shock and also usually provides a damping function whereby rotation of the gimbal assembly about the output axis is damped.

Floated gyroscopes are well known in the art and are characterized by their ruggedness and sensitivity. They are, however, subject to certain errors in the form of torques that are applied to the floated gimbal about its output axis. One of the sources of error is identified as the "buoyancy uncertainty torque." The "buoyancy uncertainty torque" is defined as being the torque caused by the center of buoyancy of the floated gimbal being displaced from the pivotal or output axis of the gimbal. The "buoyancy uncertainty torque" is effected by creep of the materials of the gimbal assembly, looseness of parts and temperature variations as well as the overall size and weight of the floated gimbal assembly. It has been found that ungainly physical size of the gimbal assembly compounds the "buoyancy uncertainty torque." Thus, it follows that to reduce the "buoyancy uncertainty torque," the size of the gimbal assembly should be maintained as small as possible consistent with the desired moment of inertia required for the gyroscopic device. It has been found that the size of the gimbal assemblies designed to float in the prior art floatation fluids can be reduced to a certain extent for any given moment of inertia of the gyroscope rotor.

By more compactly arranging the various elements of the gimbal assembly the overall gimbal physical size can be reduced with the gimbal weight not being reduced in proportion to the decrease in physical size and with the gyro rotor moment of inertia remaining constant. By selecting a fluid having a higher specific gravity the increase in density of the gimbal assembly is compensated for and the gimbal remains buoyed in substantially neutral suspension in the fluid. The reduction in gimbal size permitted by the high specific gravity fluid thus results in a reduction in the "buoyancy uncertainty torque" of the gyro and consequently provides a more accurate gyro.

It follows therefore that there are advantages to be realized in using a buoyant fluid that has a high specific gravity.

Prior art hydraulic fluids having high densities are known. However, these prior art hydraulic fluids have comparatively high freezing points which limit their application. For example, the hydraulic fluids known in the art as "Fluorolubes" and which are in wide spread use at the present time for floated gyroscope applications have the serious shortcoming that they freeze and fracture at temperatures far above −65° F. It has been found necessary to take special and expensive precautions when using these prior art hydraulic fluids in floated gyroscopes that are to be subjected to extremely cold conditions to maintain the temperature of the gyroscopes above the freezing points of the fluids. This is often quite inconvenient since many gyroscope applications are such that the devices are operated only intermittently while being exposed to the ambient temperature during periods of idle operation, said ambient temperatures often being below the freezing and fracturing point of these prior art hydraulic fluids. It has been found that should freezing and fracturing of the prior art hydraulic fluids take place, severe damage is done to the more delicate parts of the gyroscope such as the flexible electrically conductive leads used for energizing the spin motor on the gimbal assembly, for example.

The present invention consists of the combination of a gyroscopic device of the floated type comprising in part a gimbal structure for hermetically enclosing a gyroscope spin motor and a unique hydraulic fluid which has a high density and also a comparatively low freezing point. The present invention results in a gyroscopic device which may be subjected to the extremes of temperature likely to be encountered in air-borne devices without danger of the hydraulic fluid in which is floated the gimbal freezing and fracturing so as to damage the device. The high density of the unique hydraulic fluid allows the design of a compact gimbal assembly so as to maintain the physical size of the assembly as small as is practical and consistent with the moment of inertia requirements of the rotor of the gyroscope.

The details of the unique hydraulic fluid referred to above form the subject matter of our separate copending application, executed on even date herewith entitled Hydraulic Fluids, Serial Number 537,870, filed September 30, 1955, and which is assigned to the same assignee as the subject application. While specific reference may be made to said copending application for details of the improved hydraulic fluid, it may be stated herein that in general it consists essentially of a polymeric bromoalkyl silicone having a structure

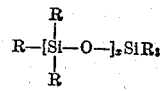

wherein $x$ represents a number equal to at least one and R represents a bromoalkyl group such as a bromomethyl group.

It is an object, therefore, of this invention to provide an improved gyroscopic device.

A further object of the invention is to provide a gyroscopic device comprising in part a gimbal hermetically enclosing a gyroscope, a container for rotatably supporting said gimbal, and a unique fluid in said container for buoying said gimbal in neutral suspension in said fluid, said fluid being characterized by having a relatively high specific gravity and a relatively low freezing point as compared to the prior art hydraulic fluid used in floated gyroscopes.

A further object of the invention is to provide in a floated gyroscope the combination of a gimbal assembly adapted to be supported by hydraulic means and a hydraulic fluid disposed so as to support said gimbal assembly and being characterized by having a high specific gravity and a low freezing point so that the physical size of the gimbal assembly may be relatively small and so that the fluid will not freeze and fracture in cold ambient temperatures during periods of time when the gyroscopic device is not being operated.

Other and more specific objects of the invention will be set forth more fully in and become apparent from a reading of the following specification and appended claims, in conjunction with the accompanying drawing in which is isometrically shown a floated gyroscope with portions thereof cut away embodying the teachings of our invention.

Referring now to the drawing numeral 10 represents a floated gyroscope comprising in part a hollow cylindrical outer housing 12 the ends of which are closed as at 14 and 16. A pair of apertured partition members 18 and 20 are disposed within housing 12 and form integral portions thereof and are positioned adjacent to and parallel to end portions 14 and 16. A gimbal assembly 22 is positioned within housing 12 and comprises in part a cylindrical shell 24 which hermetically encloses a gyroscope rotor 26 supported for rotation on a frame 28. Suitable means, not shown, are provided for spinning rotor 26. A pair of co-axial shafts 30 and 32 are integral with cylinder 24 of the gimbal assembly 22 and have portions 34 and 36 on their respective ends of reduced diameter for cooperation with bearings 38 and 40 which are centrally located in partition members 18 and 20 respectively. Preferably, bearings 38 and 40 are of the jewel type although not specifically shown as such in the drawing. Through the action of shafts 30 and 32 attached to cylinder 24 and bearings 38 and 40, the gimbal assembly 22 is supported for rotation about a pivotal or output axis defined by bearings 38 and 40.

Positioned to the left of cylinder 24 as shown in the drawing is the stator member 42 of a signal generator 41 the rotor 44 of which is attached to shaft 30 of the gimbal assembly. Suitable windings 46 are positioned on inwardly extending polar projections 48 of stator 42.

A torque generator 51 is positioned to the right of cylinder 24 as shown in the drawing and comprises a stator 52 positioned within housing 12 and a rotor 54 mounted on shaft 32 of the gimbal assembly. Suitable windings 56 are positioned on inwardly extending polar projections 58 of the stator 52.

Windings, not shown, are provided for energizing the spinning means for the rotor 26 of the gimbal assembly as well as for energizing winding means 46 and 56 of the signal generator 41 and torque generator 51 respectively.

A hydraulic fluid 60 is disposed within housing 12 and without cylinder 24 so as to buoyantly support the gimbal assembly 22. A gap 62 formed between the outer surface of cylinder 24 and the inner surface of housing 12 has the fluid 60 disposed therein. Fluid 60 in gap 62 provides a viscous restraint on the rotation of gimbal assembly 22 about its pivotal axis.

The density of hydraulic fluid 60 is taken into consideration in the design of the gimbal assembly so that the overall density of the gimbal assembly is substantially the same as the density of the fluid 60. Thus, when the gimbal assembly 22 is immersed in fluid 60, it is buoyed in substantial neutral suspension in the fluid and consequently no direct loading is placed on bearings 38 and 40.

For a detailed explanation of the composition of fluid 60 reference may be made to the above mentioned copending application of the applicant's. However, it may be stated at this point that fluid 60 consists essentially of a polymeric bromoalkyl silicone having a structure

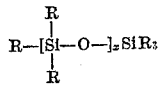

wherein x represents a number equal to at least one and R represents a bromoalkyl group such as bromomethyl. The density of this fluid is substantially between 1.4 and 2.5. The fluid also has a Newtonian viscosity behavior.

While we have shown and described a specific embodiment of this invention, further modifications and improvements will occur to those skilled in the art. We desire to be understood, therefore, that this invention is not limited to the particular form shown and we intend in the appended claims to cover all modifications which do not depart from the spirit and scope of this invention.

What we claim is:

1. In combination: a gyroscopic device of the floated type adapted to be subject to temperatures as low as $-65°$ F. comprising a gimbal assembly hermetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a polymeric composition of matter comprising a compound identified by the structural formula

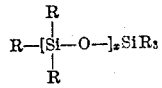

wherein x represents a value of at least 1, and wherein R represents a bromoalkyl group, said composition having a density substantially the same as the density of said gimbal assembly and having Newtonian viscosity behavior, and said fluid having the property of remaining in a liquid state at temperatures as low as $-65°$ F.

2. In combination: a gyroscopic device of the floated type adapted to be subject to temperatures as low as $-65°$ F. comprising a gimbal assembly hermetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a polymeric composition of matter comprising a compound identified by the structural formula

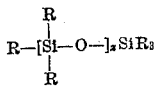

wherein x represents a value of at least 1, and wherein R represents a bromomethyl group, said composition having a density substantially the same as the density of said gimbal assembly and having Newtonian viscosity behavior, and said fluid having the property of remaining in a liquid state at temperatures as low as $-65°$ F.

3. In combination: a gyroscopic device of the floated type adapted to be subject to temperatures as low as $-65°$ F. comprising a gimbal assembly hermetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a polymeric composition of matter having a density substantially the same as the density of said gimbal assembly with a viscosity ranging from 100 to 6000 centipoises and consisting essentially of a compound represented by

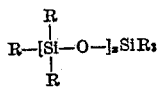

wherein x is a value equal to at least 1, and wherein R represents a bromoalkyl group, said composition having Newtonian viscosity behavior, and said fluid having the property of remaining in a liquid state at temperatures as low as $-65°$ F.

4. In combination: a gyroscopic device of the floated type adapted to be subject to temperatures as low as $-65°$ F. comprising a gimbal assembly hermetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a polymeric composition of matter having a density substantially the same as the density of said gimbal assembly with a viscosity ranging from 100 to 6000 centipoises and consisting essentially of a compound represented by $$R-[\underset{\underset{R}{|}}{\overset{\overset{R}{|}}{Si}}-O-]_xSiR_3$$

wherein $x$ is a value equal to at least 1, and wherein R represents a bromomethyl group, said composition having Newtonian viscosity behavior, and said fluid having the property of remaining in a liquid state at temperatures as low as $-65°$ F.

5. In combination: a gyroscopic device of the floated type adapted to be subject to temperatures as low as $-65°$ F. comprising a gimbal assembly hermetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a hydraulic fluid consisting essentially of a relatively highly brominated polymeric silicone having a density substantially the same as the density of said gimbal assembly and having Newtonian viscosity behavior, and said fluid having the property of remaining in a liquid state at temperatures as low as $-65°$ F.

6. In combination: a gyroscopic device of the floated type adapted to be subject to temperatures as low as $-65°$ F. comprising a gimbal assembly hermetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a hydraulic fluid consisting essentially of a polymeric silicone compound having a bromomethyl group attached to a polymeric silicone atom, and having a density substantially the same as the density of said gimbal assembly and having Newtonian viscosity behavior, and said fluid having the property of remaining in a liquid state at temperatures as low as $-65°$ F.

7. In combination: a gyroscopic device of the floated type adapted to be subject to temperatures as $-65°$ F. comprising a gimbal assembly heremetically enclosing a gyroscope and adapted to be immersed in a fluid so as to be in substantially neutral suspension therein; a container for rotatably supporting said gimbal; and a fluid in said container for buoying said gimbal in substantial neutral suspension in said fluid, said fluid being a hydraulic damping fluid comprising a brominated polymeric silicone represented by $$R-[\underset{\underset{R}{|}}{\overset{\overset{R}{|}}{Si}}-O-]_xSiR_3$$

wherein $x$ represents a number having a value of at least 1 and R represents a bromoalkyl group, and wherein there is substantial similarity between values of $x$ between various constituent molecules, and said fluid having the property of remaining in a liquid state at temperatures as low as $-65°$ F.

References Cited in the file of this patent

UNITED STATES PATENTS

| 2,585,024 | Lundberg | Feb. 12, 1952 |
| 2,618,159 | Johnson et al. | Nov. 18, 1952 |
| 2,625,045 | Brubaker | Jan. 13, 1953 |